(12) United States Patent
Mori et al.

(10) Patent No.: US 6,937,654 B2
(45) Date of Patent: Aug. 30, 2005

(54) MOVING PICTURE CODING CONTROL APPARATUS, AND CODING CONTROL DATABASE GENERATING APPARATUS

(75) Inventors: Masashi Mori, Tokyo (JP); Kunio Nakaoka, Tokyo (JP); Hiroaki Sakai, Tokyo (JP); Yoshinari Sugegaya, Tokyo (JP); Satoru Isoda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 453 days.

(21) Appl. No.: 10/273,149

(22) Filed: Oct. 18, 2002

(65) Prior Publication Data

US 2003/0202577 A1 Oct. 30, 2003

(30) Foreign Application Priority Data

Apr. 17, 2002 (JP) ........................................ 2002-114391

(51) Int. Cl.[7] ................................................ H04N 7/12
(52) U.S. Cl. .................................................. 375/240.08
(58) Field of Search ...................... 375/240.01, 240.08, 375/240.24, 240.26; H04N 7/12

(56) References Cited

FOREIGN PATENT DOCUMENTS

| JP | 6-22298 | 1/1994 |
|---|---|---|
| JP | 6-22304 | 1/1994 |
| JP | 6-327003 | 11/1994 |
| JP | 9-261648 | 10/1997 |
| JP | 10-23421 | 1/1998 |
| JP | 2001-061148 A | 3/2001 |
| JP | 2001-352542 A | 12/2001 |

*Primary Examiner*—Young Lee
(74) *Attorney, Agent, or Firm*—Burns, Doane, Swecker & Mathis, LLP

(57) ABSTRACT

Optimum relationship of data between local features, a coding data quantity, a quantity that expresses picture quality, and local coding parameters, for each block is stored. Extracted local features of one to a plurality of frames are stored. Setting of local coding parameters of each block included in one to a plurality of frames is adjusted so that the distribution of coding data quantity of each block in one to a plurality of frames is optimized within a predetermined range of data quantity based on the stored optimum relationship and local features.

5 Claims, 10 Drawing Sheets

MOVING PICTURE CODING CONTROL APPARATUS, AND CODING CONTROL DATABASE GENERATING APPARATUS

BACKGROUND OF THE INVENTION

1) Field of the Invention

The present invention relates to a moving picture coding control apparatus executes an optimum control of coding parameters within a given range of data quantity, and a coding control database generating apparatus for use in portable devices.

2) Description of the Related Art

In a moving picture coding system like moving pictures experts group (MPEG), it is essential to perform an optimum control of coding parameters. Such control is performed to provide users with a high-quality picture reproduction service with a small quantity of moving picture data, or in order to obtain a high-quality picture in a portable moving-picture reproduction terminal that has a limited data storage capacity.

In the conventional technique, various kinds of coding parameters have been controlled for data allocation, based on only local information on coding blocks. Therefore, according to the conventional technique, when there is a small data quantity for allocation to whole blocks, it has not been possible to set optimum local coding parameters for realizing a data allocation to each block in good balance within frames or between frames. Consequently, this has been a cause of distortion in various kinds of images.

For example, while an excessive data quantity is allocated to a certain coding block, a sufficient data quantity cannot be allocated to blocks that require allocation of a sufficient data quantity such as a boundary area. This imbalance has caused the occurrence of block noise or mosquito noise. Further, according to the conventional technique, the setting of coding parameters that takes into account the continuity between adjacent blocks has not been carried out. Therefore, this has caused the occurrence of block noise. Further, when a scene changes between frames, data has not been suitably allocated to take balance in data quantity between the frames. Therefore, this has also caused the occurrence of a phenomenon that a reproduced moving picture has an unnatural movement.

SUMMARY OF THE INVENTION

It is an object of this invention to provide a moving picture coding control apparatus that carries out an optimum global control of coding parameters within a given range of data quantity so that the apparatus can obtain a high-quality reproduction picture in the instance where a data quantity is small, a line has a small data band, and where it is not possible to take a large data storage capacity.

It is another object of the present invention to provide a coding control database generating apparatus that can generate a database of local coding parameters that can obtain a high-quality reproduction picture using a small data quantity.

In the moving picture coding control apparatus according to one aspect of the present invention, local coding parameters of each block included in one to a plurality of frames are adjusted and set so that the distribution of coding data quantity of each block in one to a plurality of frames is optimized within a predetermined range of data quantity and that the distribution of picture quality between the blocks is optimized within one to a plurality of frames. Therefore, it becomes possible to achieve an optimum data quantity allocation.

In the coding control database generating apparatus according to another aspect of the present invention, the quantity that expresses picture quality, the coding data quantity, the local features, and the local coding parameters, are stored in a set. The stored data is analyzed. The coding control database is prepared that is constructed of an optimum relationship of data between the local features, the coding data quantity, the quantity that expresses picture quality, and the local coding parameters, for each block. Therefore, it is possible to obtain a database of local coding parameters that can obtain a high-quality reproduction picture using a small data quantity.

These and other objects, features and advantages of the present invention are specifically set forth in or will become apparent from the following detailed descriptions of the invention when read in conjunction with the accompanying drawings.

DETAILED DESCRIPTIONS

Embodiments of the moving picture coding control apparatus and the moving picture coding control database generating apparatus according to the present invention will be explained in detail below with reference to the accompanying drawings.

Figure 2:
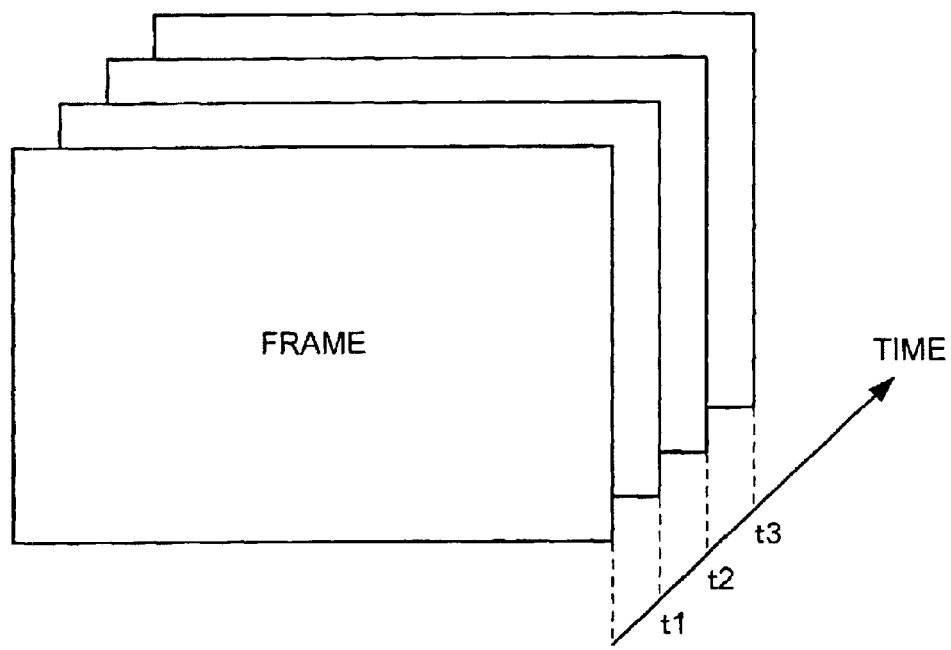
FIG. 2 is a diagram which shows the concept of frames of a moving picture.
Figure 3:
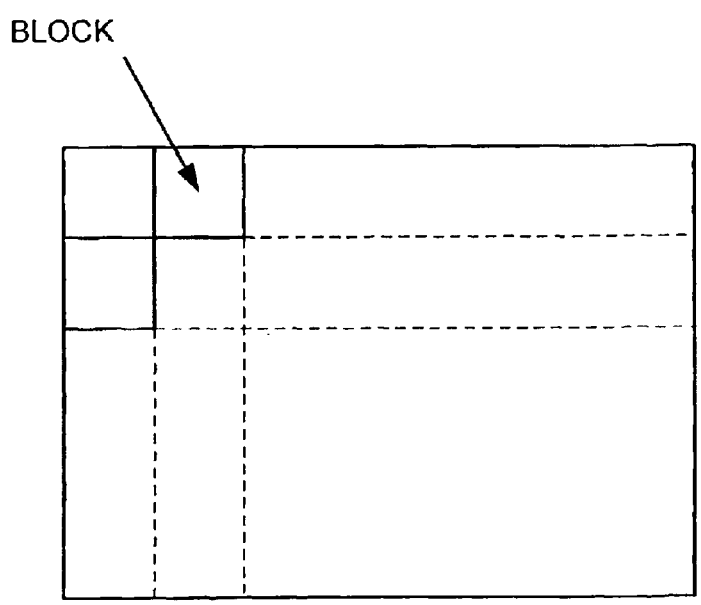
FIG. 3 is a diagram which shows the concept of blocks within a moving picture frame.

To begin with, definitions of terms used in this specification will be explained. In the moving picture coding apparatus, most coding systems execute coding in the units of frames and blocks. A moving picture can be regarded as a series of still pictures at predetermined time intervals (mostly, constant time). Each still picture of a picked-up image as shown in FIG. 2 is called a frame. Each frame is further divided into squares of the same sizes as shown in FIG. 3. This square is called a block. Coding is performed in the unit of this block. A method of dividing blocks and a block name are different depending on coding systems. For example, in an MPEG system, a block is called a macro block, and this substantially becomes a coding processing unit.

Further, in the moving picture coding apparatus, it is necessary to statically assign several coding parameters, or dynamically assign several coding parameters to control the operation in the middle of motions. In this way, the coding parameters are divided into global coding parameters and local coding parameters.

Global coding parameters are coding parameters that statically determine a policy of coding as a whole. The global coding parameters include an average frame rate (fps: frame per second), a data rate (bps: bit per second), and resolution (HXV (line×pixel)).

Local coding parameters are as coding parameters that are dynamically changed in a block unit during a coding operation. Taking the MPEG system as an example, the local coding parameters include a quantization level of a quantization carried out after a discrete cosine conversion, a macro block type, a macro block pattern (CBP: coded block pattern), and an optimum motion vector after an evaluation. The local coding parameters usually include a plurality of parameters. In the coding system like the MPEG, there is no rule of a change setting method for local coding parameters. However, several standard control procedures are provided as reference installation.

A local feature (or a feature) is a quantity that becomes a standard for dynamically setting local coding parameters. For example, in a motion compensation coding system, a motion vector search processing is executed to search for a motion vector that represents a position at which a block error (a sum of absolute differentials between pixels) is smallest between a current frame and an adjacent frame to which the blocks belong. A local feature refers to this motion vector or the error (a sum of absolute differentials between pixels) for obtaining the motion vector.

Other examples of local features and local coding parameters corresponding to these local features will be listed below.

Total sum of absolute values of AC components after a DCT is a local feature. A local coding parameter corresponding to this local feature is a quantization level.

Difference between a current block and an adjacent block at the same positions is a local feature. A local coding parameter corresponding to this local feature is a macro block type.

A minimum difference between blocks in the motion vector search processing and a motion vector that shows this position is a local feature. A local coding parameter corresponding to this local feature is a macro block type.

Total sum of absolute values of DCT coefficients after a quantization processing is a local feature. A local coding parameter corresponding to this local feature is a coded block pattern (CBP).

A quantity that represents picture quality refers to a signal to noise (SN) ratio between an original picture block and a decoded picture block, or an absolute differential sum between pixels of an original picture block and pixels of a decoded picture block.

In a first embodiment of the present invention, in the moving picture coding control, data quantity allocation is carried out based on not only local information in a block unit. Instead, information on local features of each block is collected in the unit of one to a plurality of frames. After making a global judgement on the distribution of features over one to a plurality of frames, local coding parameters are set to each block. Based on this, an optimum data quantity allocation is executed.

In order to realize this moving picture coding control, a plurality of sample moving picture data are coded in advance. Features of blocks, local coding parameters, coding data quantity, and information on quantity that expresses picture quality, that are necessary to code blocks, are collected by a large quantity in advance. These data are statistically analyzed to extract relationships between the features of blocks, the local coding parameters, the coding data quantity, and the quantity that expresses picture quality. These relationships are set in databases, and the databases are used to control the coding of moving pictures. This arrangement makes it possible to execute an optimum data quantity allocation in high precision.

Figure 1:
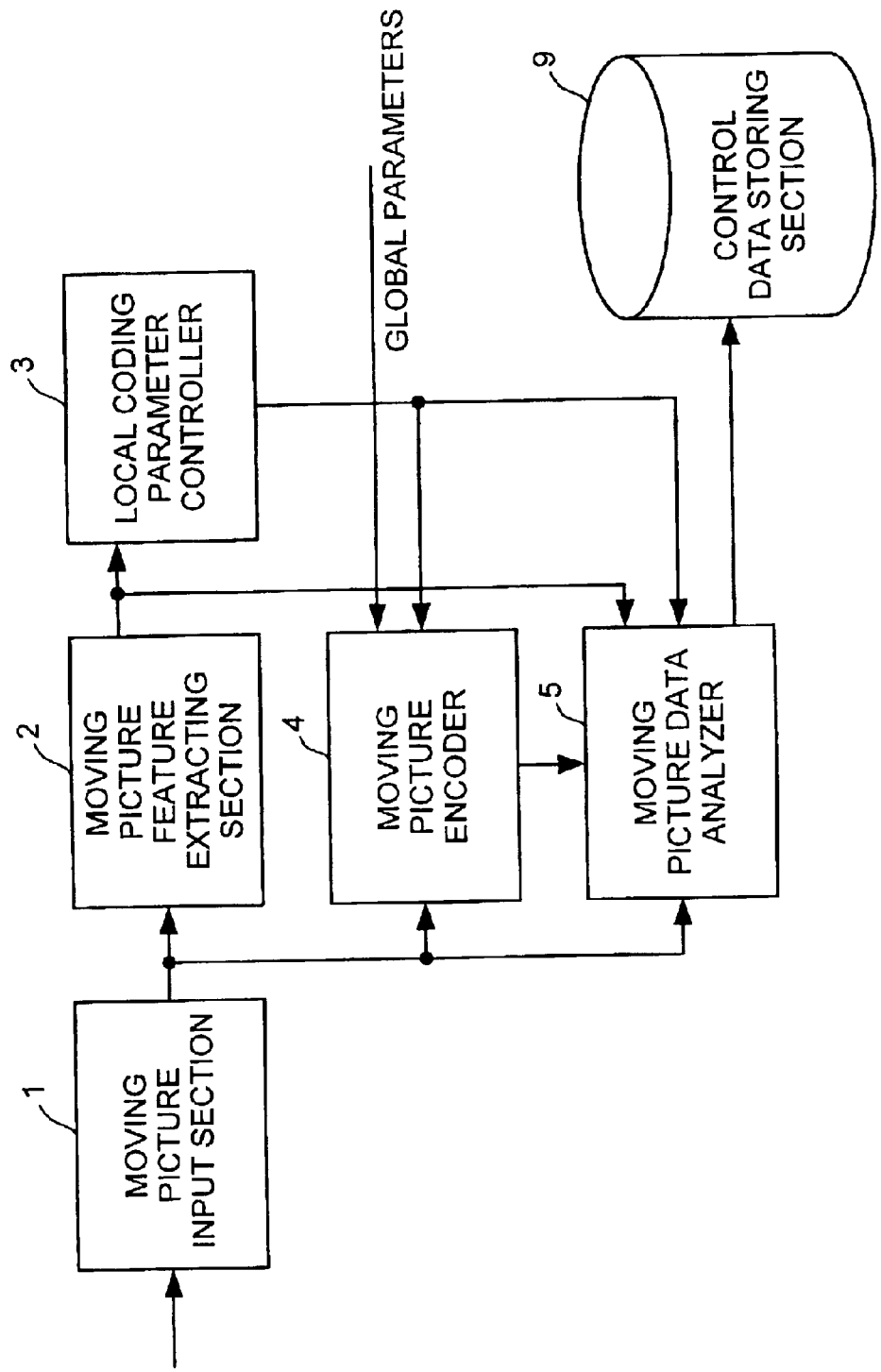
FIG. 1 is a block diagram which shows a structure of a coding control database generating apparatus according to a first embodiment of the present invention.

A coding control database generating apparatus that generates a coding control database will be explained. FIG. 1 is a block diagram which shows an internal structure of the coding control database generating apparatus according to the first embodiment. In this coding control database generating apparatus, a most basic profile called a simple profile in an MPEG-4 will be used as the coding system.

This coding control database generating apparatus comprises a moving picture input section 1, a moving picture feature extracting section 2, a local coding parameter controller 3, a moving picture encoder 4, a moving picture data analyzer 5, and a control data storing section 9.

The moving picture input section 1 divides a sample picture data before coding processing that has been input from an image pickup camera or a computer, into frames and further into blocks. The moving picture input section 1 then outputs the sample picture data divided into the blocks, to the moving picture feature extracting section 2, the moving picture encoder 4, and the moving picture data analyzer 5. The moving picture feature extracting section 2 calculates various kinds of local features such as the motion vector based on the block data input from the moving picture input section 1. The moving picture feature extracting section 2 outputs the calculated local feature to the local coding parameter controller 3 and the moving picture data analyzer 5. Based on the local features output from the moving picture feature extracting section 2, the local coding parameter controller 3 obtains local coding parameters such as a quantization level and a macro block type corresponding to these local features. The local coding parameter controller 3 outputs the obtained local coding parameters to the moving picture encoder 4 and the moving picture data analyzer 5.

The moving picture encoder 4 uses, as input data, the local coding parameters that are input from the local coding parameter controller 3, the global coding parameters that are input from the outside, and block data that is input from the moving picture input section 1. The moving picture encoder 4 encodes the block data in the MPEG-4 simple profile, using the global coding parameters and the local coding parameters. The moving picture encoder 4 outputs the coding data to the moving picture data analyzer 5.

The moving picture data analyzer 5 uses, as input data, the block data from the moving picture input section 1, the local features from the moving picture feature extracting section 2, the local coding parameters from the local coding parameter controller 3, and the coding data quantity from the moving picture encoder 4. The moving picture data analyzer 5 obtains an SN ratio between the picture blocks and an absolute differential sum between pixels of these picture blocks, by using the original picture block from the moving picture input section 1 and the local decoded picture block from the moving picture encoder 4. Based on this, the moving picture data analyzer 5 calculates the quantity that expresses the picture quality of these blocks. In executing the coding of the MPEG system, in order to carry out a move compensation processing, the moving picture encoder 4 inversely quantizes a quantized DCT coefficient, and further carries out an inverse DCT, thereby to prepare local decoded moving picture data. Therefore, it is possible to calculate the quantity that expresses picture quality by using this local decoded moving picture data.

The moving picture data analyzer 5 stores the local features, the local coding parameters, the quantity that expresses picture quality, and the coding data quantity, in a set. Then, the moving picture data analyzer 5 analyzes the data that have been stored in a set, and analyzes relationships between the local features, the local coding parameters, the quantity that expresses picture quality, and the coding data quantity. Based on this, the moving picture data analyzer 5 prepares the coding control database.

The control data storing section 9 stores the coding control database prepared by the moving picture data analyzer 5.

Figure 4:
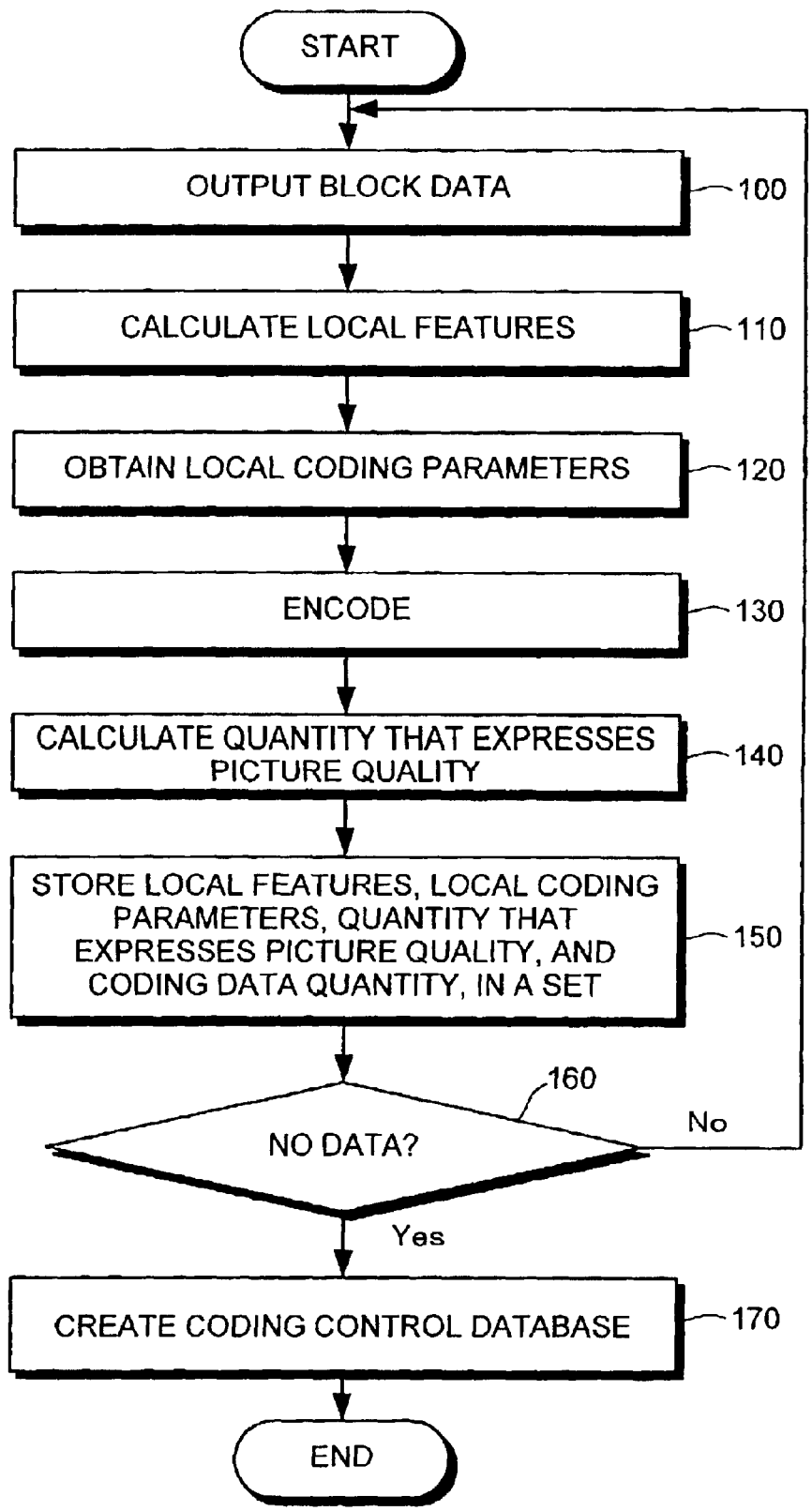
FIG. 4 is a flowchart which shows the operation of the coding control database generating apparatus shown in FIG. 1.

The procedure of preparing the coding control database will now be explained with reference to FIG. 4.

The moving picture input section 1 divides the sample moving picture data into frames and further into blocks. The moving picture input section 1 outputs the sample moving picture data divided into blocks to the moving picture feature extracting section 2, the moving picture encoder 4, and the moving picture data analyzer 5 (step 100).

The moving picture feature extracting section 2 calculates the local features such as the motion vector based on the block data from the moving picture input section 1. The moving picture feature extracting section 2 outputs the calculated local features to the local coding parameter controller 3 and the moving picture data analyzer 5 (step 110).

The local coding parameter controller 3 obtains the local coding parameters such as the quantization level and the macro block type based on the local features output from the moving picture feature extracting section 2. The local coding parameter controller 3 outputs the obtained local coding parameters to the moving picture encoder 4 and the moving picture data analyzer 5 (step 120).

The moving picture encoder 4 uses, as input data, the local coding parameters that are input from the local coding parameter controller 3, the global coding parameters that are input from the outside, and block data that is input from the moving picture input section 1. The moving picture encoder 4 encodes the block data in the MPEG-4 simple profile, using the global coding parameters and the local coding parameters. Then, the moving picture encoder 4 outputs the coding data to the moving picture data analyzer 5 (step 130).

The moving picture data analyzer 5 calculates the quantity that expresses the picture quality of blocks, by using the original picture block from the moving picture input section 1 and the local decoded picture block from the moving picture encoder 4 (step 140).

The moving picture data analyzer 5 calculates the coding data quantity of the blocks, by using the coding data from the moving picture encoder. Then, the moving picture data analyzer 5 stores the calculated quantity that expresses picture quality and the calculated coding data quantity, together with the local features from the moving picture feature extracting section 2 and the local coding parameters from the local coding parameter controller 3, in a set, into the memory within the moving picture data analyzer 5 (step 150).

A series of the processing from steps 100 to 150 is repeated until when all frames and all blocks of sample moving picture data to be coded have been completed (step 160).

When the data collection has finished for a large number of sample moving pictures, the moving picture data analyzer 5 analyzes the data that have been stored in a set, and analyzes relationships between the local features, the local coding parameters, the quantity that expresses picture quality, and the coding data quantity. Based on this, the moving picture data analyzer 5 prepares the coding control database as a data table which shows the relationships (step 170).

In general, there is a certain (functional) relationship between the local features of a block and the coding parameters of a block of a moving picture that is to be coded. It is possible to obtain this relationship by collecting a large data quantity, and extracting this relationship by statistically processing the data. Several statistical methods for collecting a large data quantity, eliminating noise components, and extracting essential relationships are known. According to these methods, portions that have causal relationships and portions that do not have relationships are extracted separately, and causal (functional) relationships are taken out from the portions having these relationships.

In general, the moving picture coding apparatus can obtain the whole information on a large quantity of blocks, by coding several representative sample moving pictures. Therefore, local features, local coding parameters, quantity that expresses picture quality and coding data quantity are collected for each block of several representative sample moving pictures. A certain statistical method is applied to the collected large data quantity, thereby to extract relationships between the local features, local coding parameters, quantity that expresses picture quality and coding data quantity. These extracted relationships are expressed in functions.

Figure 5:
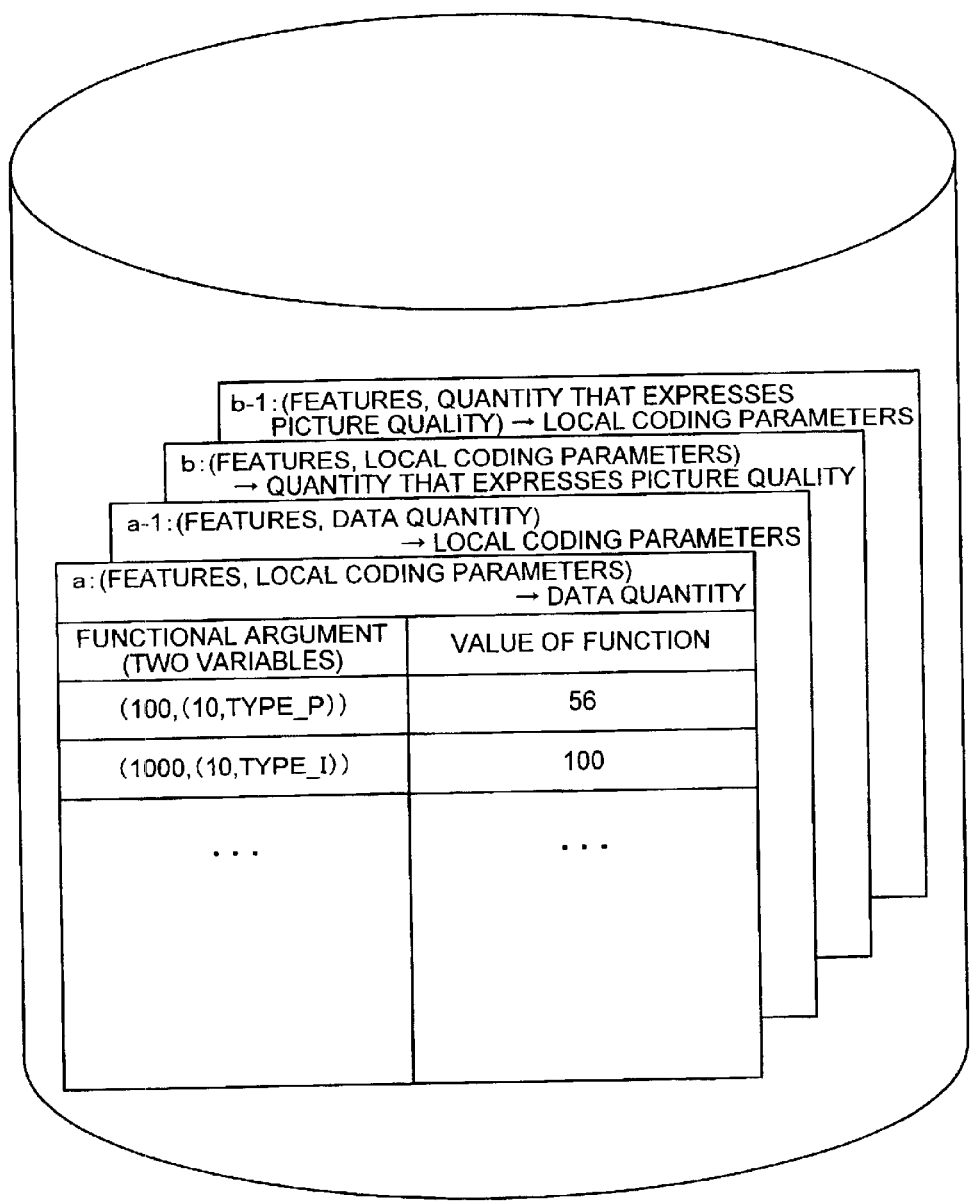
FIG. 5 is a diagram which explains the memory contents of a control data storing section.

FIG. 5 shows one example of a coding control database that has been obtained by employing the above statistical method.

The coding control database is constructed of four functions of a, a-1, b, and b-1, which are defined respectively as follows.

Function a: this is a function that gives a coding data quantity, using local features and local coding parameters as arguments.

Function a-1: this is a function that gives a local coding parameter, using local features and coding data quantity as arguments.

Function b: this is a function that gives a quantity that expresses picture quality, using local features and local coding parameters as arguments.

Function b-1: this is a function that gives a local coding parameter, using local features and a quality that expresses picture quality as arguments.

Data tables that express these four functions, or four functional relationships, obtained as above are stored in the control data storing section 9 as the coding control database.

An embodiment of a moving picture coding control apparatus will be explained with reference to FIG. 6 to FIG. 10. This moving picture coding control apparatus uses a most basic profile in the MPEG-4 that is called a simple profile, as the coding system.

Figure 6:
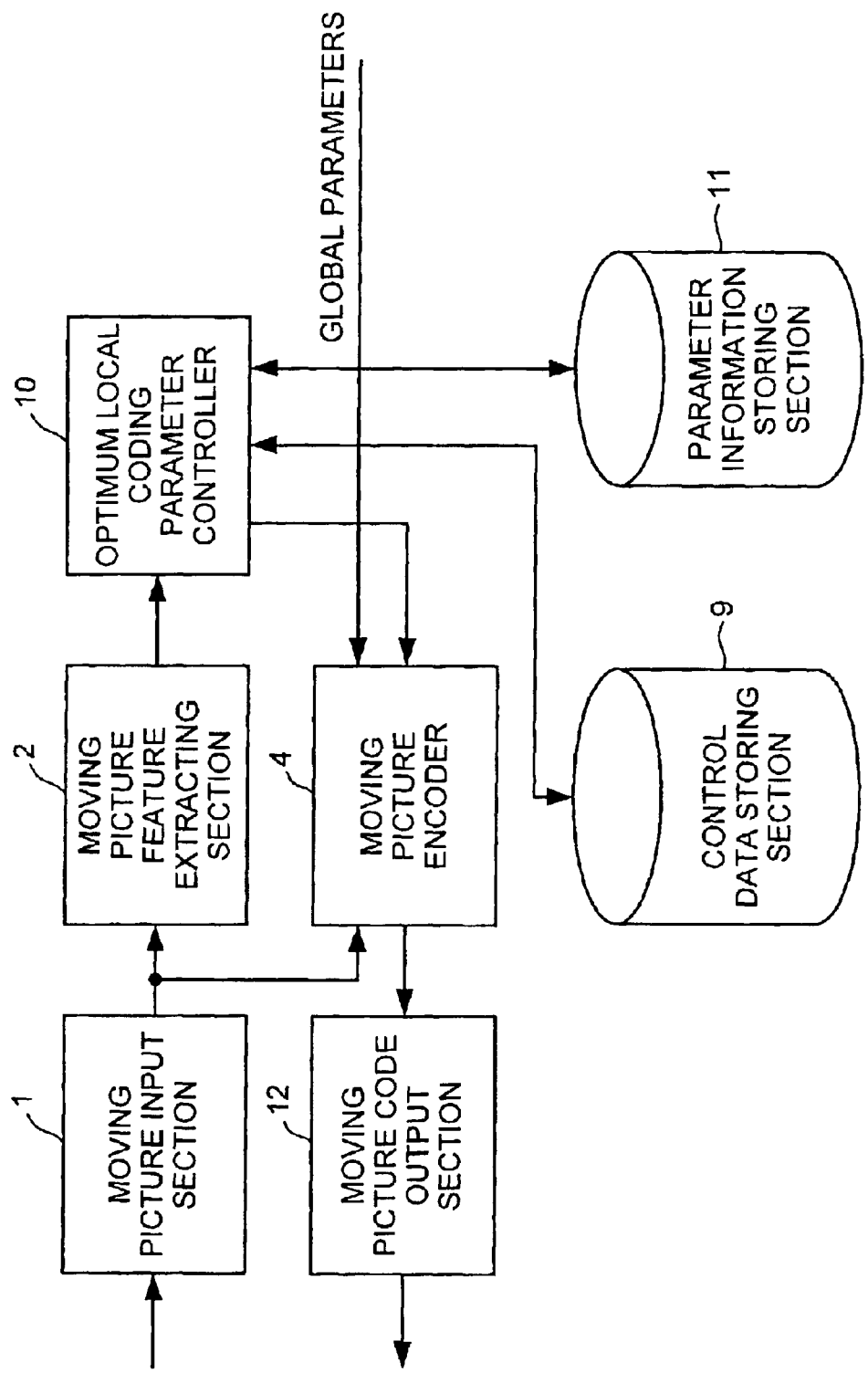
FIG. 6 is a block diagram which shows a structure of the moving picture coding control apparatus according to the first embodiment of the present invention.

FIG. 6 is a block diagram which shows an embodiment of the moving picture coding control apparatus. This moving picture coding control apparatus is constructed of a moving picture input section 1, a moving picture feature extracting section 2, a moving picture encoder 4, a control data storing section 9, an optimum local coding parameter controller 10, a parameter information storing section 11, and a moving picture code output section 12. Constituent elements that achieve similar functions to those of the constituent elements shown in FIG. 1 are attached with like reference numbers.

Figure 7:
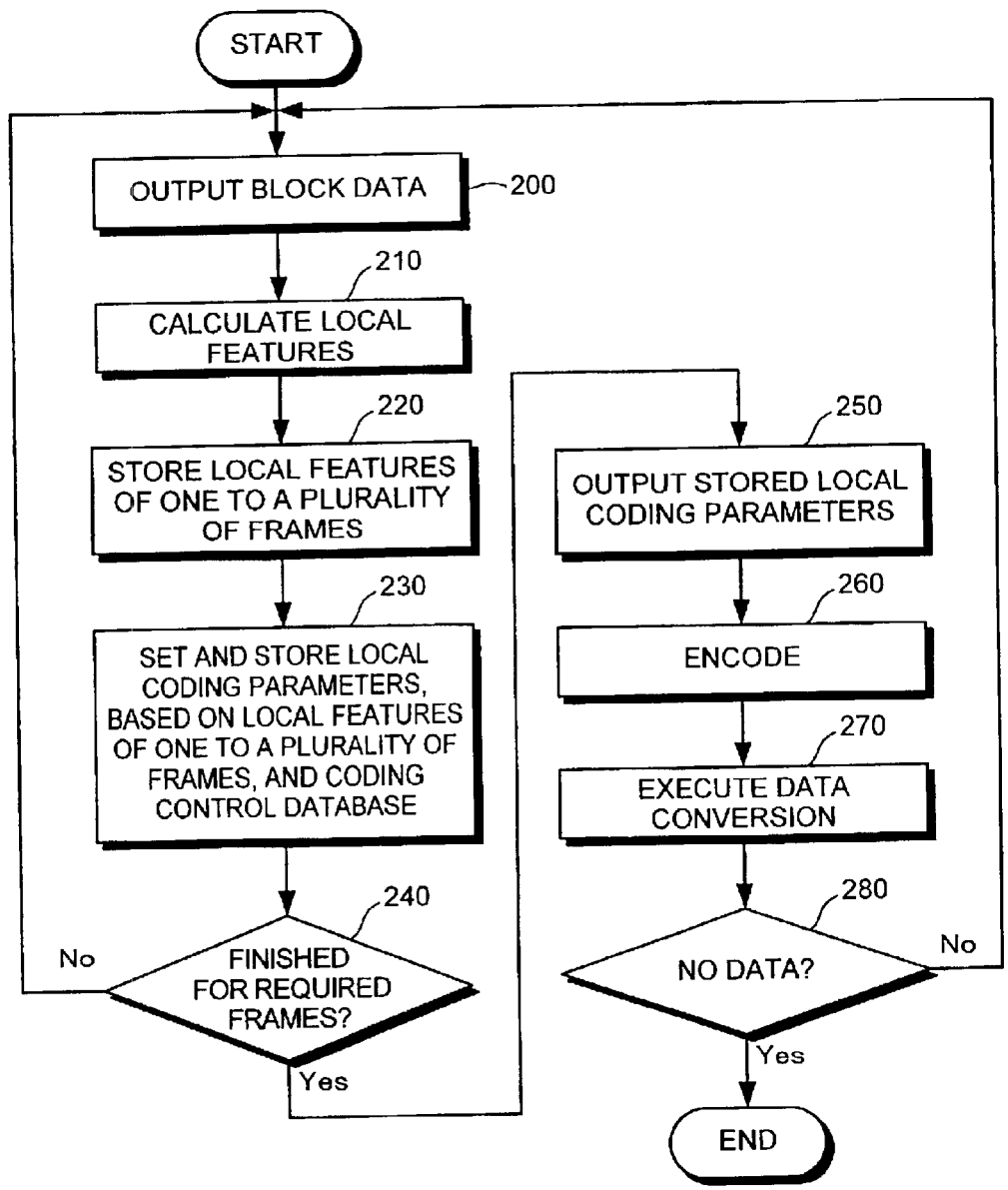
FIG. 7 is a flowchart which shows the operation of the moving picture coding control apparatus shown in FIG. 6.
Figure 8:
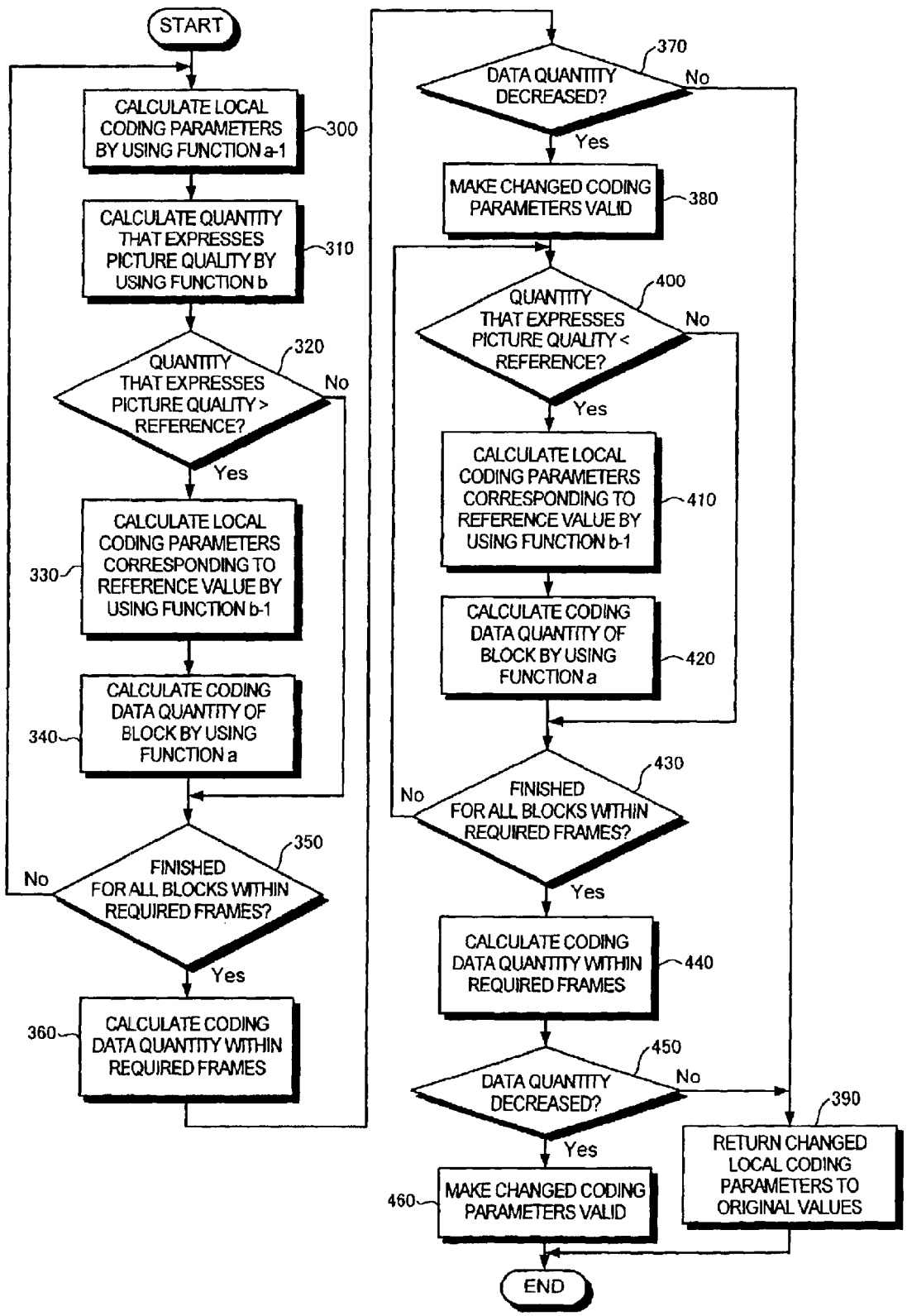
FIG. 8 is a flowchart which shows the operation of an optimum local coding parameter controller of the moving picture coding control apparatus shown in FIG. 6.

The operation of the moving picture coding control apparatus shown in FIG. 6 will be explained with reference to flowcharts shown in FIG. 7 and FIG. 8.

The moving picture input section 1 divides an optional moving picture data before coding processing that has been input from an image pickup camera or a computer, into frames and further into blocks. The moving picture input section 1 then outputs the moving picture data divided into the blocks, to the moving picture feature extracting section 2 and the moving picture encoder 4 (step 200). The moving picture feature extracting section 2 calculates a local feature such as the motion vector based on the block data from the moving picture input section 1. The moving picture feature extracting section 2 outputs the calculated local feature to the optimum local coding parameter controller 10 (step 210).

The optimum local coding parameter controller 10 stores features of each block of one to a plurality of frames input from the moving picture feature extracting section 2, into the parameter information storing section 11 (step 220).

Figure 9:
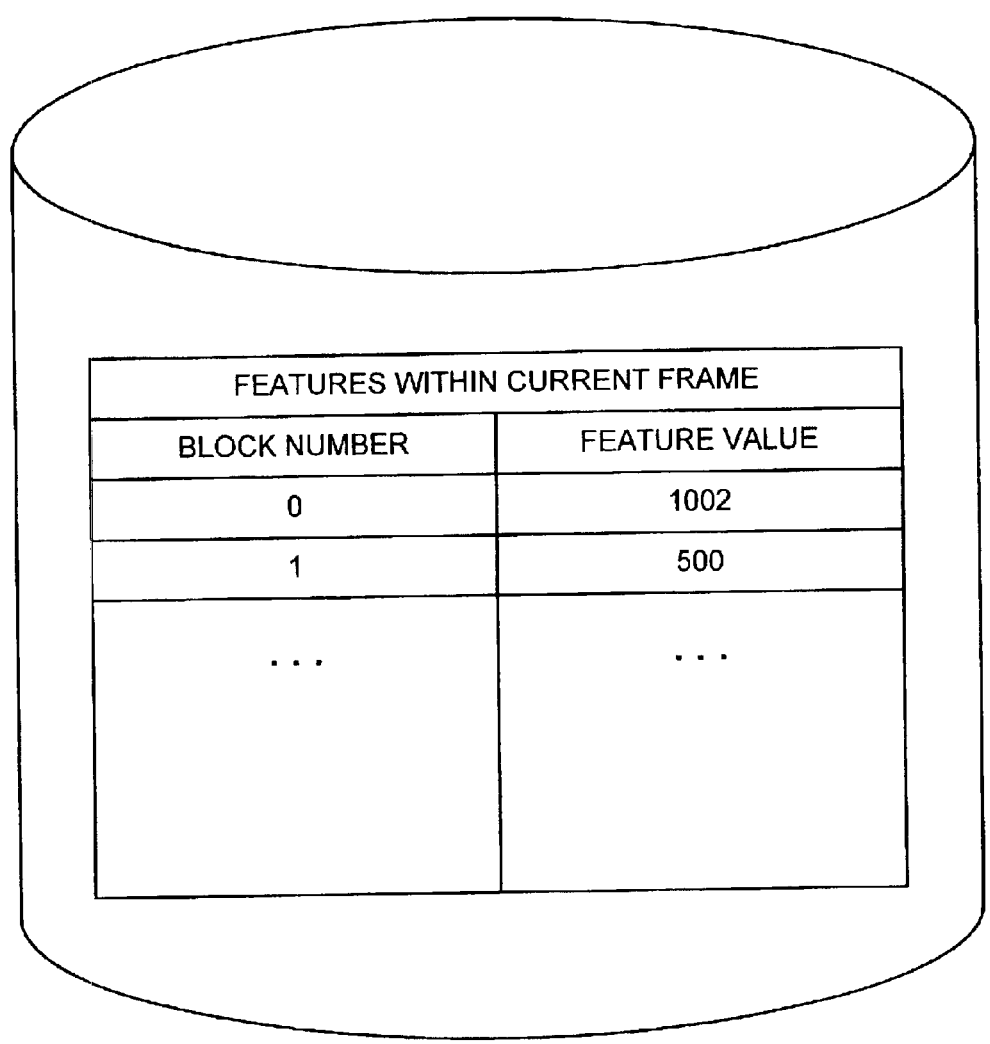
FIG. 9 is a diagram which shows an example of the memory contents of a parameter information storing section of the moving picture coding control apparatus shown in FIG. 6.
Figure 10:
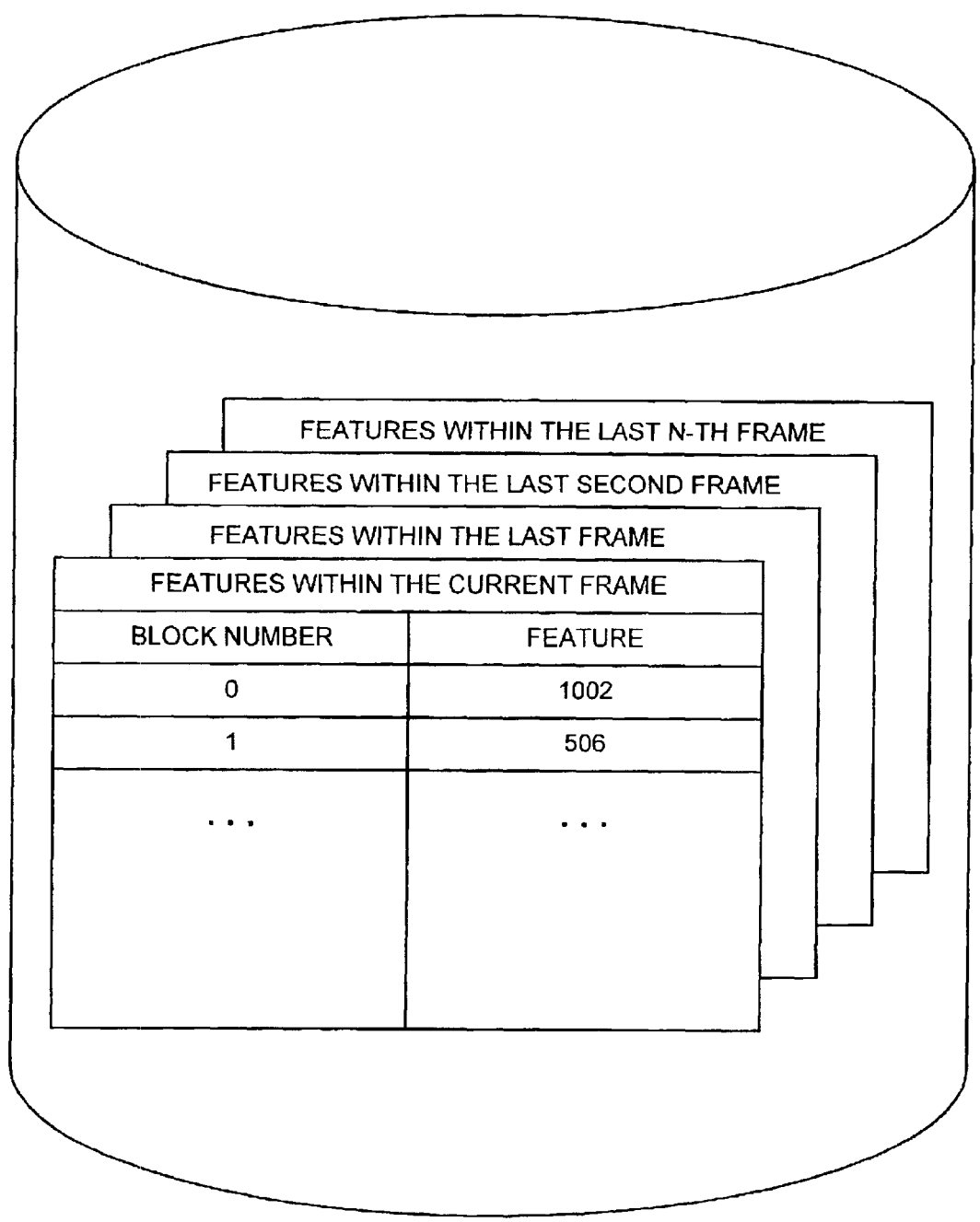
FIG. 10 is a diagram which shows another example of the memory contents of the parameter information storing section of the moving picture coding control apparatus shown in FIG. 6.

FIG. 9 shows an example of storing features of each block of one frame into the parameter information storing section 11. FIG. 10 shows an example of storing features of each block of a plurality of frames into the parameter information storing section 11.

The optimum local coding parameter controller 10 sets local coding parameters of each block of one to a plurality of frames, based on the feature data of one to a plurality of frames stored in the parameter information storing section 11, and the coding control database consisting of the four functions stored in the control data storing section 9. Based on this, the optimum local coding parameter controller 10 globally adjusts the distribution of the data quantity. The optimum local coding parameter controller 10 stores the local coding parameters of each block set in this way, into the parameter information storing section 11. This operation will be explained in detail later.

The optimum local coding parameter controller 10 repeatedly executes the setting processing 1 coding parameters of each block of one to a plurality of frames, until when the setting processing has been completed for the whole frames (a loop of step 240 to step 230). In other words, for setting the local coding parameters of each block for each one frame as shown in FIG. 9, the setting and storing of local coding parameters at steps 200 to 400 is executed in one frame unit. For setting the local coding parameters of each block of a plurality of frames as shown in FIG. 10, the setting and storing of local coding parameters at steps 200 to 400 is executed for the plurality of frames.

Next, the optimum local coding parameter controller 10 outputs the local coding parameters of each block of one to a plurality of frames stored in the parameter information storing section 11, to the moving picture encoder 4 (step 250).

The moving picture encoder 4 executes the coding, by using the local coding parameters of each block input from the optimum local coding parameter controller 10, the global coding parameters input from the outside, and the block data before the coding input from the moving picture input section 1. The moving picture encoder 4 outputs the coding data to the moving picture code output section 12 (step 260).

The moving picture code output section 12 stores the input moving picture coding data into the storing unit, and converts the data into data of a format that can be transmitted to the communication line. The moving picture code output section 12 outputs the converted moving picture coding data (step 270).

A series of the above processing is repeated until when all frames in the moving picture data to be coded have been completed (a loop from step 280 to step 270).

A detailed processing at step 230 shown in FIG. 7 will be explained with reference to FIG. 8.

The coding data quantity is uniformly allocated to each block of each frame at an initial stage. A reference value has been set to the quantity that expresses picture quality.

The optimum local coding parameter controller 10 repeatedly executes the processing at step 300 to step 340 for all blocks in one to a plurality of frames as the unit of setting and storing processing of the local coding parameters.

First, the optimum local coding parameter controller 10 allocates the features of the blocks stored in the parameter information storing section 11 and the coding data quantity allocated to the blocks (quantity allocated uniformly, in this instance), to the function a-1 of the coding control database of the control data storing section 9. Based on this, the optimum local coding parameter controller 10 calculates the local coding parameters corresponding to these values (step 300).

Further, the optimum local coding parameter controller 10 allocates the calculated local coding parameters and the features of the blocks, to the function b of the coding control database of the control data storing section 9. Based on this, the optimum local coding parameter controller 10 calculates the quantity that expresses picture quality corresponding to these values (step 310).

The optimum local coding parameter controller 10 compares the quantity that expresses picture quality with a predetermined reference value (step 320). When the quantity that expresses picture quality exceeds the reference value, the optimum local coding parameter controller 10 allocates this reference value and the features of the blocks to the function b1 of the coding control database of the control data storing section 9. Based on this, the optimum local coding parameter controller 10 calculates local coding parameters corresponding to the reference value (picture quality), and obtains the result as new local coding parameters (step 330).

Further, the optimum local coding parameter controller 10 allocates the new local coding parameters and the features of the blocks, to the function a of the coding control database of the control data storing section 9. Based on this, the optimum local coding parameter controller 10 calculates the coding data quantity of the block, and obtains the result as new coding data quantity (step 340).

In the comparison at step 320, concerning a certain block of which the quantity that expresses picture quality does not exceed the reference value, the local coding parameters are not changed. The coding data quantity is also left as the quantity that has been allocated uniformly.

The above processing is executed repeatedly for all blocks in one to a plurality of frames. When the processing has finished for all blocks in one to a plurality of frames (step 350), the coding data quantities of all blocks in one to a plurality of frames are totaled, and the data quantity in one to a plurality of frames is calculated (step 360). Next, the calculated data quantity is compared with the data quantity at the initial stage (step 370). When the data quantity has decreased, that is, when it is in a relationship of, calculated data quantity<data quantity at the initial stage, the local coding parameters of the changed blocks are made valid (step 380). When the data quantity remains unchanged or when the data quantity has increased, the changed local coding parameters of the blocks are returned to the original values (step 390). The above completes the processing of data of one to a plurality of frames.

Next, a processing is executed for blocks in one to a plurality of frames of which picture quality is lower than the reference value.

The optimum local coding parameter controller 10 compares the quantity that expresses picture quality obtained at step 310 with a predetermined reference value (step 400).

When the quantity that expresses picture quality becomes lower than the reference value, the optimum local coding parameter controller 10 allocates the reference value and the features of the blocks to the function b-1 of the coding control database of the control data storing section 9. Based on this, the optimum local coding parameter controller 10 calculates local coding parameters corresponding to the reference value (picture quality), and obtains the result as new local coding parameters (step 410).

Further, the optimum local coding parameter controller 10 allocates the new local coding parameters and the features of the blocks, to the function a of the coding control database of the control data storing section 9. Based on this, the optimum local coding parameter controller 10 calculates the coding data quantity, and obtains the result as new coding data quantity of the blocks (step 420).

In the comparison at step 400, concerning a certain block of which the quantity that expresses picture quality does not become lower than the reference value, the local coding parameters are not changed. The coding data quantity is also left as the quantity that has been allocated uniformly or the data quantity changed at step 340.

The above processing is executed repeatedly for all blocks in one to a plurality of frames. When the processing has finished for all blocks in one to a plurality of frames (step 430), the coding data quantities of all blocks in one to a plurality of frames are totaled, and the data quantity in one to a plurality of frames is calculated (step 440). Next, the calculated data quantity is compared with the data quantity at the initial stage (step 450). When the data quantity has decreased, that is, when it is in a relationship of, calculated data quantity<data quantity at the initial stage, the local coding parameters of the changed blocks are made valid (step 460). When the data quantity remains unchanged or when the data quantity has increased, the local coding parameters of each block changed in the processing at step 410 are returned to the original values (step 390). The above completes the processing of data of one to a plurality of frames.

Then, the local coding parameters of all blocks of one to a plurality of frames obtained in the above processing are stored into the parameter information storing section 11.

As explained above, according to the first embodiment, in the moving picture coding control, controlling the data quantity allocation is carried out based on not only local information in block unit. Instead, information on local features of each block is collected in the unit of one to a plurality of frames. After making a global judgement on the distribution of features over one to a plurality of frames, local coding parameters are set to each block. Based on this, an optimum data quantity allocation is executed. Therefore, it is possible to reduce block noise and mosquito noise. Further, it is possible to provide a reproduction of a moving picture having smooth movement.

In order to realize this moving picture coding control, a plurality of sample moving picture data are coded in advance. Features of blocks, local coding parameters, coding data quantity, and information on quantity that expresses picture quality, that are necessary to code blocks, are collected by a large quantity in advance. These data are statistically analyzed to extract relationships between the features of blocks, the local coding parameters, the coding data quantity, and the quantity that expresses picture quality. These relationships are set in databases, and the databases are used to control the coding of moving pictures. This arrangement makes it possible to execute an optimum data quantity allocation in high precision.

Figure 11:
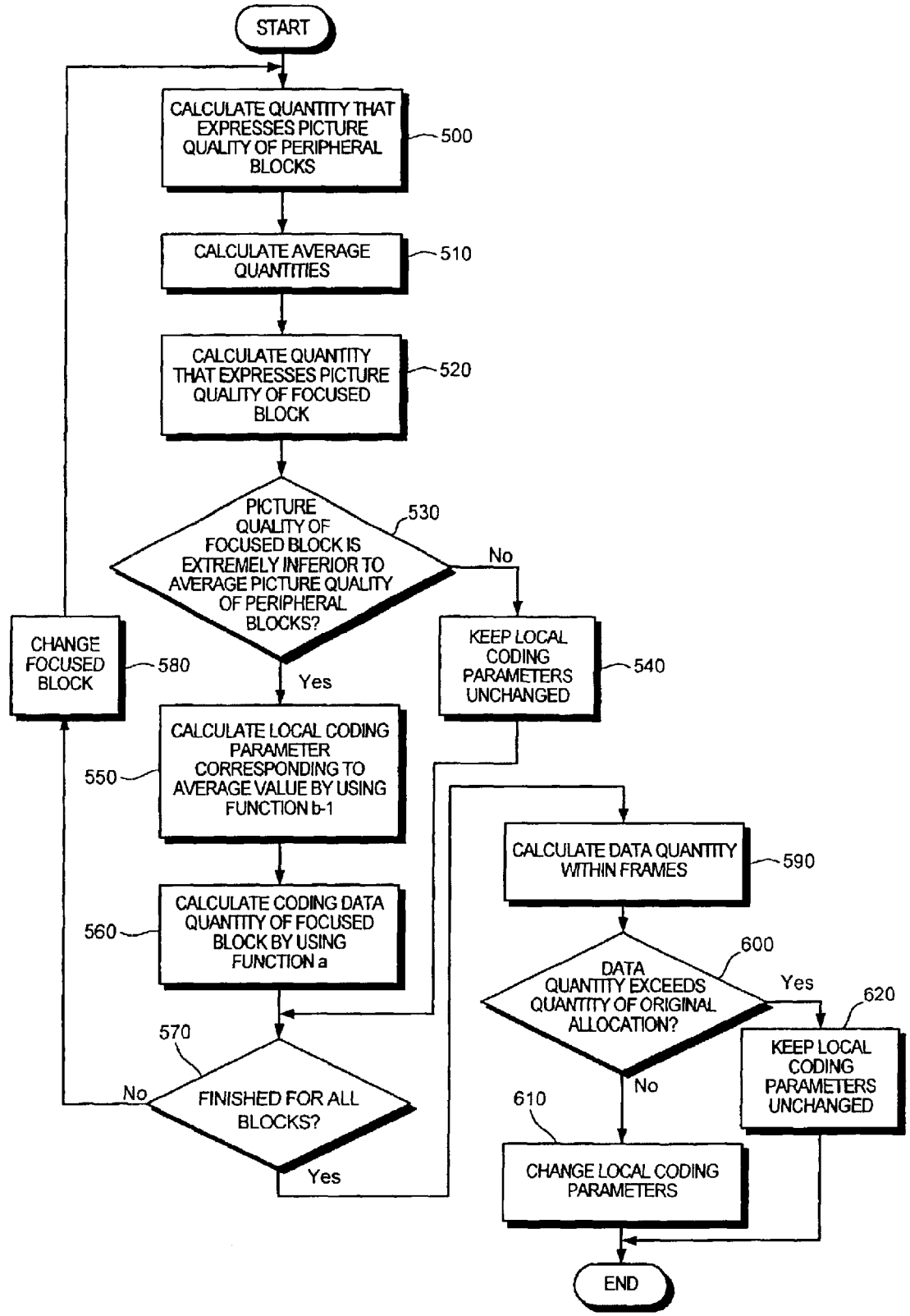
FIG. 11 is a flowchart which shows the operation of a moving picture coding control apparatus according to a second embodiment of the present invention.

A second embodiment of the present invention will be explained next with reference to FIG. 11. In the second embodiment, an optimum local coding parameter controller 10 of a moving picture coding control apparatus globally adjusts the distribution of data quantity, and also adjusts the distribution of data quantity near each coding block.

In the following explanation, a peripheral block refers to an adjacent block within one frame, when a parameter information storing section 11 stores data of one frame. When the parameter information storing section 11 stores data of a plurality of frames, the peripheral block refers to an adjacent block within one frame, or a block at the same position in the preceding frame or a block adjacent to this block.

It is assumed that the processing of globally adjusting the distribution of data quantity has already been completed. Further, it is assumed that, based on this global adjustment processing, the data quantity after the processing has become smaller than the data quantity allocated at an initial stage.

The quantity that expresses picture quality is calculated for each of peripheral blocks of one focused block within one frame, by using the function b of a coding control database of a control data storing section 9 (step 500). Further, an average value of the quantities is calculated (step 510).

The quantity that expresses picture quality is also calculated for the block in focus, by using the function b of the coding control database of the control data storing section 9 (step 520).

The quantity that expresses the picture quality of the focused block is compared with the average value of the peripheral blocks (step 530). When the quantity that expresses the picture quality of the focused block is extremely inferior to the average value, that is, when there is a difference of a predetermined value or more between both values, the processing at the next steps 550 to 570 are executed. Otherwise, the local coding parameters of the focused block are not changed (step 540).

At step 550, the average value of the peripheral blocks and the features of the focused block are allocated to the function b-1 of the coding control database of the control data storing section 9. Based on this, local coding parameters corresponding to these values are calculated, and the calculated results are obtained as new local coding parameters.

Further, the new local coding parameters and the features of the focused block are allocated to the function a of the coding control database of the control data storing section 9. Based on this, the coding data quantity is calculated, and the calculated result is obtained as new coding data quantity of the block (step 560).

Next, a decision is made as to whether the processing of all blocks in one frame has finished or not (step 570). When the processing of all blocks has not been finished, the focused block is changed (step 580), and the processing at step 500 to step 560 are executed again. The above processing is executed repeatedly for all blocks in one frame, and the processing is executed repeatedly by changing the focused block.

When the processing has finished for all blocks in one frame (step 570), the coding data quantities of all blocks in one frame are totaled, and the data quantity in one frame is calculated (step 590). Next, this calculated data quantity is compared with the data quantity at the initial stage (the data quantity before the global adjustment processing) (step 600). When the calculated data quantity has not increased from the data quantity at the initial stage, the local coding parameters of the changed blocks are made valid (step 610). When the calculated data quantity has increased from the data quantity at the initial stage, the local coding parameters of the blocks changed by the processing at step 550 are returned to the original values (step 620). The above completes the processing of data of one frame.

The local coding parameters of all blocks in one frame obtained by the above processing are stored into a parameter information storing section 11.

As explained above, according to the second embodiment, the distribution of the data quantity of peripheral blocks of each coding block is also adjusted. Therefore, it is possible to secure the continuity of coding parameters between blocks, and it becomes possible to reduce block noise.

It is also possible to provide a structure that can revise the coding control database stored in the control data storing section 9, based on the information stored in the parameter information storing section 11. For this purpose, the optimum local coding parameter controller 10 of the moving picture coding control apparatus is made to have a function that can reflect the information stored in the parameter information storing section 11, in the functional relationship of the coding control database stored in the control data storing section 9, by using the statistical method.

According to the statistical method employed by the moving picture analyzer 5 shown in FIG. 1, in general, a large data quantity is collected, noise components are eliminated, and an essential (functional) relationship is extracted. Further, when new data has entered, it is also possible to reflect this data in the functional relationship, and improve the precision of the functions. Therefore, this function is also provided in the optimum local coding parameter controller 10 of the moving picture coding control apparatus.

This database revising function is realized as follows. For various kinds of moving picture data that are input from the moving picture input section 1, the optimum local coding parameter controller 10 stores the local features of each block, the local coding parameters of each block, the quantity that expresses the picture quality of each block, and the coding data quantity for each block, in a set, into the parameter information storing section 11.

Then, the optimum local coding parameter controller 10 applies the statistical method to the stored large data quantity. Based on this, the optimum local coding parameter controller 10 extracts relationships between the local features, the local coding parameters, the quantity that expresses picture quality, and the coding data quantity. The optimum local coding parameter controller 10 reflects the extracted result, in the function a, the function a-1, the function b, and the function b-1 of the coding control database of the control data storing section 9.

Based on the revision of the coding control database, it is possible to improve the precision of the changing processing of the local coding parameter setting, and it becomes possible to achieve a high-quality moving picture reproduction within a given range of data quantity.

As explained above, according to the moving picture coding control apparatus of the present invention, local coding parameters of each block included in one to a plurality of frames are adjusted and set so that the distribution of coding data quantity of each block in one to a plurality of frames is optimized within a predetermined range of data quantity and that the distribution of picture quality between the blocks is optimized within one to a plurality of frames. Therefore, it becomes possible to achieve an optimum data quantity allocation. As a result, it is possible to reduce block noise and mosquito noise. Further, it is possible to provide a reproduction of a moving picture having smooth movement.

Moreover, the same data quantity is allocated to each block at the beginning. The quantity that expresses picture quality is calculated for each block, by using this same data quantity. The picture quality is lowered to a reference value for only a block of which the quantity that expresses picture quality exceeds the reference value, and the coding parameters are set again. This processing is executed for each block in one to a plurality of frames. Only when the sum of the data quantities of blocks calculated based on the changed coding parameters has decreased from the data quantity at the initial stage, the changed coding parameters are made valid. Therefore, it is possible to obtain local coding parameters of each block that optimize the distribution of the coding data quantity and the picture quality distribution of each block in one to a plurality of frames. As a result, it is possible to reduce block noise and mosquito noise. Further, it is possible to provide a reproduction of a moving picture having smooth movement.

Furthermore, a focus is placed on a block for which the picture quality in one to a plurality of frames is lower than a reference value. The picture quality is increased to the reference value for only a block of which the quantity that expresses picture quality becomes lower than the reference value, and the coding parameters are set again. This processing is executed for each block in one to a plurality of frames. Only when the sum of the data quantities of blocks calculated based on the changed coding parameters has decreased from the data quantity at the initial stage, the changed coding parameters are made valid. Therefore, it is possible to obtain local coding parameters of each block that optimize the distribution of the coding data quantity and the picture quality distribution of each block in one to a plurality of frames. As a result, it is possible to reduce block noise and mosquito noise. Further, it is possible to provide a reproduction of a moving picture having smooth movement.

Moreover, the distribution of data quantity is adjusted to equalize the picture quality of each block with the picture quality of peripheral blocks. Based on this, local coding parameters of each block are adjusted and set. Therefore, it is possible to secure the continuity of coding parameters between blocks, and it becomes possible to reduce block noise.

Furthermore, the coding control database stored in the control data storing section is revised using the data stored in the parameter information storing section at the time of coding various kinds of moving picture data. Therefore, it is possible to improve the precision of the changing processing of the local coding parameter setting, and it becomes possible to achieve a high-quality moving picture reproduction within a given range of data quantity.

According to the coding control database generating apparatus of the present invention, the quantity that expresses picture quality, the coding data quantity, the local features, and the local coding parameters, are stored in a set. The stored data is analyzed. The coding control database is prepared that is constructed of an optimum relationship of data between the local features, the coding data quantity, the quantity that expresses picture quality, and the local coding parameters, for each block. Therefore, it is possible to obtain a database of local coding parameters that can obtain a high-quality reproduction picture using a small data quantity.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A moving picture coding control apparatus comprising:
   a control data storing section that stores a coding control database, the coding control database including an optimum relationship of data between local features, a coding data quantity, a quantity that expresses picture quality, and local coding parameters, for each block;

a moving picture input section to which a moving picture data is input;

a moving picture feature extracting section that analyzes the moving picture data that has been input to the moving picture input section, and extracts local features of a moving picture;

a parameter information storing section that stores local features of one to a plurality of frames extracted by the moving picture feature extracting section;

an optimum local coding parameter controller that adjusts a setting of local coding parameters of each block included in one to a plurality of frames so that the distribution of coding data quantity of each block in one to a plurality of frames is optimized within a predetermined range of data quantity and that the distribution of picture quality between the blocks is optimized within one to a plurality of frames, based on the local features of one to a plurality of frames stored in the parameter information storing section, and the coding control database of the control data storing section;

a moving picture encoder that encodes the moving picture data input from the moving picture input section based on the local coding parameters output from the optimum local coding parameter controller and global coding parameters input from the outside; and a moving picture code output section that outputs the moving picture data coded by the moving picture encoder.

2. The moving picture coding control apparatus according to claim 1, wherein the control data storing section stores a coding control database that prescribes a first function a that gives a coding data quantity, using local features and local coding parameters as arguments, a second function a-1 that gives a local coding parameter, using local features and coding data quantity as arguments, a third function b that gives a quantity that expresses picture quality, using local features and local coding parameters as arguments, and a fourth function b-1 that gives a local coding parameter, using local features and a quantity that expresses picture quality as arguments, and the optimum local coding parameter controller allocates an initial coding data quantity of each block as the data quantity allocated to one to a plurality of frames that has been uniformly divided by the number of blocks, allocates the features of the blocks stored in the parameter information storing section and the quantity that has been allocated uniformly, to the second function a-1, and calculates the local coding parameters corresponding to these values, allocates the calculated local coding parameters and the features of the blocks, to the third function b, and calculates the quantity that expresses picture quality corresponding to these values, compares the calculated quantity that expresses picture quality with a predetermined reference value, and when the quantity that expresses picture quality exceeds the reference value, allocates this reference value and the features of the blocks to the fourth function b-1, calculates local coding parameters corresponding to the reference value and obtains the result as a new local coding parameters, and allocates the new local coding parameters and the features of the blocks, to the first function a, calculates the coding data quantity, and obtains the result as new coding data quantity for the block, thereby to repeatedly execute the above series of processing for all blocks in one to a plurality of frames, and thereafter, totals the coding data quantities of all blocks in one to a plurality of frames, including new coding data quantities, and when the totaled data quantity has become less than the data quantity at an initial stage, makes valid the local coding parameters of the changed blocks.

3. The moving picture coding control apparatus according to claim 2, wherein the optimum local coding parameter controller compares the calculated quantity that expresses picture quality with a predetermined reference value, and when the quantity that expresses picture quality becomes lower than the reference value, allocates this reference value and the features of the blocks to the fourth function b-1, calculates local coding parameters corresponding to the reference value, and obtains the result as new local coding parameters, and allocates the new local coding parameters and the features of the blocks to the first function a, calculates the coding data quantity, and obtains the result as new coding data quantity for the block, thereby to repeatedly execute the above series of processing for all blocks in one to a plurality of frames, and thereafter, totals the coding data quantities of all blocks in one to a plurality of frames, including new coding data quantities, and when the calculated data quantity has become less than the data quantity at an initial stage, makes valid the local coding parameters of the changed blocks.

4. The moving picture coding control apparatus according to claim 1, wherein the optimum local coding parameter controller adjusts the distribution of data quantity to equalize the picture quality of each block with the picture quality of peripheral blocks, thereby to adjust the setting of local coding parameters of each block.

5. The moving picture coding control apparatus according to claim 1, wherein the parameter information storing section stores local features, a coding data quantity, a quantity that expresses picture quality, and local coding parameters, in a set, for each block of a moving picture data that is input to the moving picture input section, and the optimum local coding parameter controller revises the coding control database stored in the control data storing section, by using the data stored in the parameter information storing section.

* * * * *